US009365763B2

(12) United States Patent
Tang

(10) Patent No.: US 9,365,763 B2
(45) Date of Patent: Jun. 14, 2016

(54) LOW-VISCOSITY TREATMENT FLUIDS FOR TRANSPORTING PROPPANT

(75) Inventor: Tingji Tang, Spring, TX (US)

(73) Assignee: Halliburton Energy Services, Inc., Houston, TX (US)

(*) Notice: Subject to any disclaimer, the term of this patent is extended or adjusted under 35 U.S.C. 154(b) by 330 days.

(21) Appl. No.: 13/586,061

(22) Filed: Aug. 15, 2012

(65) Prior Publication Data

US 2014/0048272 A1 Feb. 20, 2014

(51) Int. Cl.
*C09K 8/68* (2006.01)
*E21B 43/26* (2006.01)
*C09K 8/66* (2006.01)
*C09K 8/80* (2006.01)

(52) U.S. Cl.
CPC . *C09K 8/66* (2013.01); *C09K 8/685* (2013.01); *C09K 8/80* (2013.01)

(58) Field of Classification Search
CPC .............................. A61L 15/425; E21B 43/25
USPC .................... 166/308; 514/214, 272; 507/240
See application file for complete search history.

(56) References Cited

U.S. PATENT DOCUMENTS

| | | | | |
|---|---|---|---|---|
| 4,172,066 A | * | 10/1979 | Zweigle et al. | 523/223 |
| 5,354,290 A | * | 10/1994 | Gross | 604/367 |
| 2002/0185278 A1 | * | 12/2002 | Brown et al. | 166/308 |
| 2009/0270280 A1 | | 10/2009 | Zhang et al. | |
| 2013/0000900 A1 | * | 1/2013 | Kalgaonkar et al. | 166/279 |

* cited by examiner

*Primary Examiner* — Angela M DiTrani
*Assistant Examiner* — Avi Skaist
(74) *Attorney, Agent, or Firm* — McDermott Will & Emery LLP; Craig Roddy

(57) ABSTRACT

A method of treating a subterranean formation using low-viscosity subterranean treatment fluids with proppants suspended in gel fragments, including providing a fracturing fluid comprising an aqueous base fluid, a proppant, and swellable micro-gel fragments, wherein the fracturing fluid has a low-viscosity in the range of about 0 to about 800 centipoise; allowing the micro-gel fragments to swell to form a matrix, wherein the proppant is suspended in the fracturing fluid; placing the fracturing fluid in a fracture within the subterranean formation; and allowing the matrix to at least partially degrade in the subterranean formation.

17 Claims, 3 Drawing Sheets

LOW-VISCOSITY TREATMENT FLUIDS FOR TRANSPORTING PROPPANT

BACKGROUND

The present invention relates to subterranean treatment fluids. More particularly, the present invention relates to low-viscosity subterranean treatment fluids with proppants suspended in gel fragments and methods of use thereof.

Fracturing (e.g., hydraulic fracturing) is a technique in which fractures are propagated in a rock layer by the introduction of a pressurized fluid. Often, fracturing operations are performed for the purpose of extracting certain fluids such as petroleum, natural gas, coal seam gas, and the like. Hydraulic fracturing can be used to increase or restore the rate at which such fluids can be produced from a subterranean formation.

Hydraulic fracturing often requires the use of fracturing fluids that have been viscosified. Increasing the viscosity of a fluid increases its ability to transport solids, such as proppant. Proppant acts to maintain the integrity of created fractures such that the fracture does not completely close once the fracturing pressure is released. A sufficiently high viscosity is needed to retain the proppant particulates in suspension in order to transport proppants while reducing the tendency of the proppant to settle out of the fracturing fluid before reaching the desire placement zone.

Fracturing fluids are often viscosified by gelling agents such as polysaccharides (e.g., guar gums, cellulose derivatives, etc.), biopolymers, synthetic polymers, and/or derivatives thereof to form crosslinked gels. The exact viscosities required in conventional fracturing fluids may be context dependent (e.g., formation temperature) but are generally well-known or may be ascertained by those of ordinary skill in the relevant art.

Fracturing fluid also may be used as a carrier fluid, for example, in gravel packing techniques. Gravel packing is a technique used to control formation during downhole operations. In gravel packing operations, a screen is placed in a subterranean formation across a productive interval and sand suspended in carrier fluid is pumped into the formation to fill the annular space between the screen and the formation. In some cases, an operator may choose to combine the processes of hydraulic fracturing and gravel packing into a unified treatment that can stimulate production while providing an annular gravel pack for sand control ("frac packing operations").

Once the fracturing fluid has delivered proppant to the fracture or delivered sand in gravel packing or frac packing operations, it is often desirable to lower the viscosity of the fracturing fluid such that the fluid can be recovered from the formation using minimal energy. The removal of the spent fracturing fluids from the subterranean formation is typically required to allow hydrocarbon production. This reduction in viscosity of the fracturing fluid is often achieved using a breaker that breaks the cross-linking bonds of the crosslinked gels.

Despite the widespread use of hydraulic fracturing in the recovery of hydrocarbons and natural gas, conventional fracturing fluids and techniques may have several limitations. As described earlier, conventional proppant-laden fracturing fluids are often viscosified and crosslinked, which requires the use of relatively high horsepower in order to pump and transport the proppant-laden fluid down to the target site. Conventional fracturing fluids may also suffer from fluid leakoff problems. For example, over 70% of the injected volume may leakoff during conventional fracturing. Furthermore, conventional techniques for lowering viscosities ("breaking") of fracturing fluids can be unreliable and sometimes results in incomplete and/or premature breaking of the fluid.

SUMMARY OF THE INVENTION

The present invention relates to subterranean treatment fluids. More particularly, the present invention relates to low-viscosity subterranean treatment fluids with proppants suspended in gel fragments and methods of use thereof.

In some embodiments, the present invention provides a method comprising: providing a fracturing fluid comprising an aqueous base fluid, a proppant, and swellable micro-gel fragments, wherein the fracturing fluid has a low-viscosity in the range of about 0 to about 800 centipoise; allowing the micro-gel fragments to swell to form a matrix, wherein the proppant is suspended in the fracturing fluid; placing the fracturing fluid in a fracture within the subterranean formation; and allowing the matrix to at least partially degrade in the subterranean formation.

In other embodiments, the present invention provides a method comprising: providing a fracturing fluid comprising an aqueous base fluid, a proppant, and swellable micro-gel fragments, wherein the fracturing fluid has a low-viscosity in the range of about 0 to about 800 centipoise; introducing the fracturing fluid at a rate sufficient to create or enhance at least one fracture in a subterranean formation; allowing the micro-gel fragments to swell to form a matrix, wherein the proppant is suspended in the fracturing fluid; placing the fracturing fluid in a fracture in the subterranean formation; and allowing the matrix to at least partially degrade in the subterranean formation.

In still other embodiments, the present invention provides a method comprising: providing a fracturing fluid that comprises an aqueous base fluid, a proppant, and swellable micro-gel fragments, wherein the fracturing fluid has a low-viscosity in the range of about 0 to about 800 centipoise and is free of viscosifying agents and crosslinkers; allowing the micro-gel fragments to swell to form a matrix, wherein the proppant is suspended in the fracturing fluid; placing the fracturing fluid in a fracture in the subterranean formation; and allowing the micro-gel fragment to at least partially degrade in the subterranean formation.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
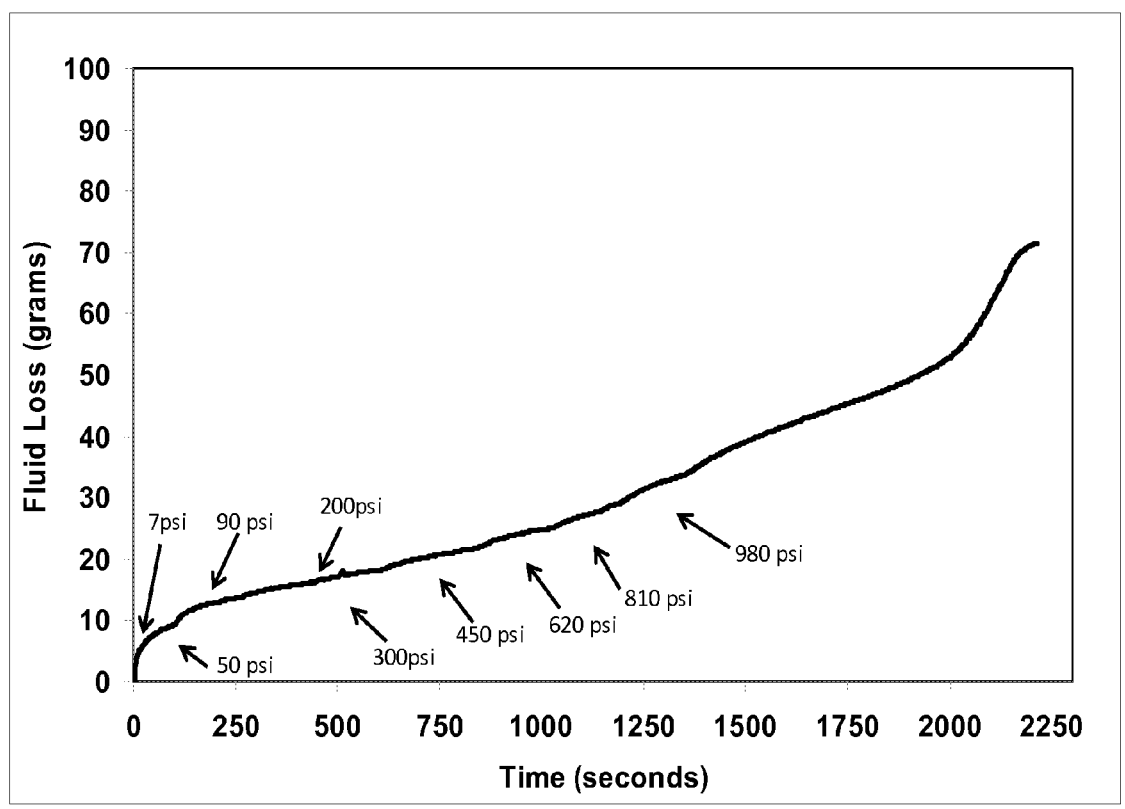
FIG. 1 depicts micro-gel fragments exhibiting superior fluid loss control properties as compared to conventional fracturing fluids, even at very high pressure.

The present invention relates to subterranean treatment fluids. More particularly, the present invention relates to low-viscosity subterranean treatment fluids with proppants suspended in gel fragments and methods of use thereof.

As used herein, the term "low-viscosity" describes the relative viscosities of fracturing fluids of the present invention compared to conventional fracturing fluids. In one or more embodiments, the fracturing fluids of the present invention require relatively low viscosity compared to the viscosity of conventional viscosified fracturing fluids. The viscosities of the low-viscosity fracturing fluids of the present invention may be in the range from about 0 to 800 centipoise ("cP"), but are preferably in the range from about 10 to 500 cP, and even more preferably in the range from about 50 to 200 cP. Relatively high viscosities are often required in viscosified fracturing fluids in order to carry proppants deep into fractures and prevent proppant settling, typically in the order of thousands of cP. The low-viscosity fracturing fluids of the present invention thus have a lower pipe friction when compared to conventional fracturing fluids.

The present invention provides a fracturing fluid that comprises, or consists essentially of, an aqueous base fluid and swellable micro-gel fragments that are able to keep proppants in suspension during a fracturing operation. This fracturing fluid is able to transport the proppants to a desired target site without having to viscosify the fracturing fluid using gelling agents and/or other additives.

The relatively low viscosities of the fracturing fluids of the present invention generally require less power to pump the fracturing fluids and/or may have superior fluid loss control properties as compared to conventional fracturing fluids. Additionally, the superior fluid loss control properties of the fracturing fluids of the present invention may eliminate the need for packers during stage fracturing, which, in turn, can save time and cost.

In one or more embodiments, the fracturing fluid of the present invention may be free or substantially free of components typically found in conventional fracturing fluids. The elimination of these components, such as gelling agents, crosslinking agents, breakers, stabilizers, bactericides, or surfactants, may lead to less formation damage and lower operating costs. In one or more embodiments, the use of fracturing fluids of the present invention may result in higher permeability regain of a subterranean formation when compared to a similar or same use of conventional viscosified fracturing fluids.

Some embodiments provide methods comprising providing a fracturing fluid comprising an aqueous base fluid, a proppant, and swellable micro-gel fragments, wherein the fracturing fluid has a low-viscosity in the range of about 0 to about 800 centipoise; allowing the micro-gel fragments to swell to form a matrix, wherein the proppant is suspended in the fracturing fluid; placing the fracturing fluid in a fracture within the subterranean formation; and allowing the matrix to at least partially degrade in the subterranean formation.

The fracturing fluids of the present invention may be injected into a subterranean formation as part of a stimulation operation such as hydraulic fracturing. As used herein, the term "fracturing fluid" may generally refer to any subterranean treatment fluid used to transport a proppant to a fracture in a subterranean formation. Oftentimes, a fracturing fluid also may be used to enhance or create at least one fracture in a subterranean formation. The fracturing fluid of the present invention comprises an aqueous base fluid, a proppant, and micro-gel fragments. The term "fragment" does not imply any particular shape or size. The micro-gel fragment of the present invention may be of any shape (e.g., rectangular, substantially rectangular, spherical, polygonal, irregular shaped, etc.) that is compatible with one or more embodiments of the present invention.

In hydraulic fracturing operations, various equipments (e.g., fracturing pumps, monitoring unit, fracturing tanks, etc.) may be used to inject fracturing fluids at rates sufficient to enhance or create fractures. In some embodiments, the fracturing fluid of the present invention may be introduced at a rate sufficient to create or enhance at least one fracture in a subterranean formation. While at least one embodiment described herein relates to the use of fracturing fluids to induce fractures in a subterranean formation, a person of ordinary skill in the art will appreciate that other fluids (e.g., prepad fluids) may be used to initiate and/or propagate fracture formation.

Some embodiments provide methods comprising: providing a fracturing fluid that comprises an aqueous base fluid, a proppant, and swellable micro-gel fragments, wherein the fracturing fluid has a low-viscosity in the range of about 0 to about 800 centipoise and is free of viscosifying agents and crosslinkers; allowing the micro-gel fragments to swell to form a matrix, wherein the proppant is suspended in the fracturing fluid; placing the fracturing fluid in a fracture in the subterranean formation; and allowing the micro-gel fragment to at least partially degrade in the subterranean formation. The fracturing fluids of the present invention generally do not need to be viscosified, which may be a key advantage.

Aqueous base fluids suitable for use in the present invention may comprise fresh water, saltwater (e.g., water containing one or more salts dissolved therein), brine (e.g., saturated salt water), seawater, produced water, flow back water, or combinations thereof. Generally, the water may be from any source, provided that it does not contain components that might adversely affect the stability and/or performance of the fracturing fluids of the present invention. Because the relatively simple chemistries and high tolerances for salt and temperature of the fracturing fluids of the present invention, the aqueous base fluids may be from contaminated water sources (e.g., produced water, flow back water), which may be a key advantage.

In certain embodiments, the pH of the aqueous base fluid may be adjusted (e.g., by a buffer or other pH adjusting agent). In these embodiments, the pH may be adjusted to a specific level, which may depend on, among other factors, the types of additives included in the treatment fluid. One of ordinary skill in the art, with the benefit of this disclosure, will recognize when such pH adjustments are appropriate. In some embodiments, the pH range may preferably be from about 4 to about 11.

In certain embodiments, the fracturing fluids of the present invention may comprise a proppant. Proppant suitable for use in the present invention may comprise any material suitable for use in subterranean operations. Suitable materials include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, metasilicate, calcium silicate, kaolin, talc, zirconia, boron, fly ash, hollow glass microspheres, solid glass, and combinations thereof. The mean proppant size generally may range from about 2 mesh to about 400 mesh on the U.S. Sieve Series; however, in certain circumstances, other mean proppant sizes may be desired and will be entirely suitable for practice of the present invention. In particular embodiments, preferred mean proppant size distribution ranges are one or more of 6/12, 8/16, 12/20, 16/30, 20/40, 30/50, 40/60, 40/70, or 50/70 mesh. It should be understood that the term "proppant," as used in this disclosure, includes all known shapes of materials, including substantially spherical materials, fibrous materials, polygonal materials (such as cubic materials), and combinations thereof. Moreover, fibrous materials, that may or may not be used to bear the pressure of a closed fracture, may be included in certain embodiments of the present invention. In certain embodiments, the proppants may be present in the fracturing fluids of the present invention in an amount in the range of from about 0.1 pounds per gallon ("ppg") to about 30 ppg by volume of the fracturing fluid, preferably from about 0.5 ppg to about 15 ppg, and more preferably from about 1.0 ppg to 10 ppg.

As used herein, the term "matrix" generally refers to a network of materials in which a structure (e.g., a proppant) is suspended between the surfaces and/or interfaces of the material (e.g., swelled micro-gel fragments). In the preferred embodiment, the matrix will have a three-dimensional structure within the fracturing fluid. In some cases, the specific structure may be embedded in the network of materials (i.e., matrix). The term "matrix" does not imply any particular shape of the network of materials or the density of materials.

The matrix of the present invention comprises or consists essentially of a network of micro-gel fragments. A plurality of proppants are suspended and/or embedded in the micro-gel matrix within the fracturing fluid. In one or more embodiments, the matrix allows or otherwise facilitates the transport of a proppant to a target site without having to viscosify the fracturing fluid (i.e., without having to crosslink gelling agents in the fracturing fluid).

The matrix of the present invention comprises micro-gel fragments that have swelled. The formation of the matrix is at least partially initiated by the swelling of the micro-gel fragment. In some embodiments, the fracturing fluid of the present invention may comprise a matrix that has been formed prior to introduction of the fracturing fluid into the subterranean formation. In other embodiments, the fracturing fluid may comprise micro-gel fragments that swell after the fracturing fluid has been introduced into the subterranean formation or while it is being introduced. The swelling of the micro-gel fragments occurs when the micro-gel fragment comes in contact with sufficient amount of aqueous liquid. Aqueous liquids suitable for initiating the swelling include fresh water, saltwater (e.g., water containing one or more salts dissolved therein), brine (e.g., saturated salt water), seawater, produced water, flow back water, and combinations thereof.

In some embodiments, the micro-gel fragment may swell after a time delay after introduction into the subterranean formation. This may be accomplished by encapsulating the micro-gel fragments with a barrier that prevents contact with surrounding aqueous fluids. The barrier may be, for example, wax or a hydrophobic material such as SandWedge®, available from Halliburton Energy Services, Inc., Duncan, Okla. Upon delivery of the gel-particles into the subterranean formation, the barrier may degrade or melt so that the micro-gel fragments are exposed to water and swell. In some embodiments, the swelling of the micro-gel fragment may be delayed by introducing the micro-gel fragments into the subterranean formation in sufficiently saturated water (e.g. a brine). Saturated water, for example, 7% KCL per volume, will tend to slow the swelling of the micro-del fragments. The micro-gel fragments can then be left to swell slowly in the presence of the brine, or may swell more quickly upon dilution of the brine water downhole.

The micro-gel fragments are generally made from a polymeric material ("bulk polymer") that has been crosslinked to form a crosslinked polymer and then prepared into smaller fragments by any suitable means (e.g., a blender, extruder, etc.). In some embodiments, the crosslinked polymer may be physically chopped into micro-gel fragments having a mean diameter ("non-swelled diameter") of about 1 micron to about 20 microns. In some embodiments, the distribution of fragment sizes may be multi-modal wherein the fragments have a distribution of diameters. In some embodiments, the fragment sizes may be mono-modal or substantially mono-model wherein the fragments are similarly sized. The micro-gel fragments may be prepared to the desired sizes by any suitable method including chopping the crosslinked gel by using, for example, a blender and/or processed by an extruder. In some embodiments, the micro-gel fragment is present in about 0.01% to about 50% by weight of the fracturing fluid. In the preferred embodiment, when the micro-gel fragment is in the wet state, it is present in about 1% to about 35% by weight of the fracturing fluid, preferably from about 5% to about 20%, and more preferably from about 10% to about 20%. In another preferred embodiment, when the micro-gel fragment is in the dry state, it is present from about 0.01% to about 10% by weight of the fracturing fluid, preferably from about 0.05% to about 5%, and more preferably from about 0.1% to about 2%.

In some embodiments, the micro-gel fragment comprises a polymer selected from the group consisting of: polyacrylamide, poly 2-acrylamido-2-methylpropane sulfonic acid, polybutylene succinate, polybutylene succinate-co-adipate, polyhydroxybutyrate-valerate, polyhydroxybutyrate-covalerate, polycaprolactone, polyester amide, starch-based polymer, polyethylene terephthalate-based polymers, sulfonated polyethylene terephthalate, polyethylene oxide, polyethylene, polypropylene, polyvinyl alcohol, aliphatic aromatic copolyester, polyacrylic acid, polyacrylamide, polyvinylpyrrolidone, polysaccharide, chitin, chitosan, protein, aliphatic polyester, polylactic acid, poly(glycolide), poly($\epsilon$-caprolactone), poly(hydroxy ester ether), poly(hydroxybutyrate), poly(anhydride), polycarbonate, poly(orthoester), poly (amino acid), poly(ethylene oxide), poly(propylene oxide), poly(phosphazene), polyester amide, polyamide, any derivative thereof, and any copolymer or blend thereof. Further description of these polymer can be found in U.S. Patent Publication 2009/0270280, the entire disclosure of which is hereby incorporated by reference. The polymer may be generated by a suitable polymerization reaction from a polymerization mixture.

The polymerization reaction may take place by any suitable mechanism such as radical initiated polymerization, condensation polymerization, ring-opening polymerization and the like. In an exemplary example, the polymerization of polyacrylamide may be initiated by an initiator such as ammonium persulfate in the presence of a metal ligand such as N,N,N',N'-tetramethylethylenediamine (TEMED or TMEDA), also referred to herein simply as "tetramethyl ethylene diamine." The polymerization of polyacrylamide may also be initiated by thermal initiation of acrylamide by persulfate sale, photoinitiation, and other redox initiation systems such as Ce(IV), for example. In some embodiments, the initiator may be present in about 0.01% to about 1% by weight of the polymerization reaction mixture. In some embodiments, TEMED may be present in about 0.05% to about 0.3% v/v of the polymerization reaction mixture.

Generally, the polymerized polymer may be crosslinked by a crosslinker to form a more complex three-dimensional structure ("crosslinked polymer"). Suitable examples of crosslinkers include, but are not limited to, N,N'-methylene bisacrylamide, N,N'-bisacrylylcystamine (BAC), N,N'-diallyltartardiamide (DATD), piperazine diacrylate (PDA), polyethylene glycol diacrylate, polyethylene glycol dimethacrylate, polypropylene glycol diacrylate, polypropylene glycol dimethacrylate, ethoxylated trimethylolpropane triacrylate, trimethylolpropane trimethacrylate, and the like. Preferably, the crosslinker forms a self-degradable crosslinking bond between the polymers. In some embodiments, the ratio of polymers to crosslinkers may range from about 5:1 to about 40:1. In some embodiments, the polymerized polymer may be present in about 0.01% to about 2% by weight of the crosslinking reaction mixture.

The micro-gel fragments of the present invention may be swellable, preferably water swellable. In some embodiments, the micro-gel fragments may absorb water (e.g., produced water, water introduced from surface, etc.) and swell (i.e., increase in volume) to form a matrix of swelled micro-gel fragments. This swelling may cause the micro-gel fragments to form a matrix or otherwise locally cluster so that proppants may be suspended and/or embedded within the matrix or cluster.

In some embodiments, swelling of the micro-gel fragments may be a time-dependent process that can delay the formation of the matrix of the present invention. The degree of swelling may depend on a number of factors including, but not limited to, the degree of crosslinking of the micro-gel fragments, the concentration of water, the salinity of water, and the temperature of the formation.

In some embodiments, the micro-gel fragment has a swelled mean diameter of about 10 µm to about 500 µm and a non-swelled diameter of about 1 µm to about 20 µm.

In the preferred embodiment, the micro-gel fragment is degradable, that is, the crosslinking bonds of the micro-gel fragment may be broken by any suitable means (e.g., in the presence of acid, base, water, etc.) to form a simpler product such as the bulk polymer. In some embodiments, the micro-gel fragment may be self-degradable.

As used herein, the terms "degrade," "degradation," "degradable," and the like refer to a material's tendency to be broken down into simpler components. In some embodiments, a degradable material may be broken down chemically by the addition of another material. As used herein, the term "self-degrade," "self-degradation," "self-degradable," and the like generally refer to the tendency of a composition to degrade over time when placed in a subterranean zone through natural means (e.g., air, light, water, heat, and the like). Degradation may generally take place by any suitable means including, but not limited to, hydrolytic degradation, surface erosion, bulk erosion, and the like.

In the preferred embodiment, the micro-gel fragments are crosslinked via ester based bonds which are self-degradable through hydrolytic degradation. Consequently, the micro-gel fragments of the present invention may self-degrade (i.e., the crosslinked bonds are broken) in the fracture, thereby depositing the transported proppants. The degraded fragments may be easily removed from the fracturing fluid and the subterranean formation after transporting proppants into the fractures. Degraded polymers typically have rheological properties which allow them to easily flow back to the top surface where they can be removed.

Optionally, the fracturing fluids of the present invention may comprise an additive selected from the group consisting of: clay control agents, scale inhibition agents, corrosion inhibition agents, dyeing agents, and combinations thereof.

Example 1

In this example micro-gel fragments were prepared according to one or more embodiments of the invention. A polyacrylamide gel ("bulk polymer") was first prepared by polymerizing acrylamide to form polyacrylamide. The reaction was performed with 8 grams ("g") of acrylamide, 0.2 g of polyethylene glycol diacrylate, and 0.4 g of ammonium persulfate. The solution was purged with nitrogen gas for 10 minutes and thereafter, 0.24 milliliters ("ml") of tetramethyl ethylene diamine ("TEMED") was added. The reaction into bulk polymer was 4-6 hours. Thereafter, the bulk polymer was chopped in a food process blender or silverson emulsifier to obtain micro-gel fragments, yielding micro-gel fragments ranging from about 20 µm to about 500 µm and were of irregular shape.

Example 2

The fluid loss control properties of the fracturing fluids containing the micro-gel fragments of Example 1 were measured using Oklahoma No. 1 (OK #1) sand, a 100 mesh high-purity quartz sand. A 15% micro-gel fragment fracturing fluid was pushed through a 2" inner diameter ("ID") fluid loss cell packed with the OK #1 sand. Fluid loss was measured as a function of time and pressure. Low fluid loss indicates better fluid loss control behavior of the fracturing fluid and a better fluid efficiency. The base fluid loss rate of OK #1 is 10.5 grams/sec at 7 pounds per square inch ("psi"). Even at very high pressure (psi), the fracturing fluid containing micro-gel fragments exhibited superior fluid loss control properties as compared to conventional fracturing fluids, as shown in FIG. 1.

Example 3

The regain of fluid loss controlling properties of the OK #1 sand in Example 1 was measured after degrading the micro-gel fragments at 180 degrees Fahrenheit and 150 psi for 24 hours. Thereafter, the 2" ID fluid loss cell was flushed with tap water to remove degraded micro-gel fragments from the OK #1 sand pack and the fluid loss rate was measured after each flush to determine regain of the OK #1 fluid loss rate. After the fifth flush, the fluid loss rate was 9.526 grams/second, corresponding to a 90% regain. Table 1 shows the fluid loss rate of the five flushes:

| Time (sec) | Flush 1 | Flush 2 | Flush 3 | Flush 4 | Flush 5 |
|---|---|---|---|---|---|
| | | (fluid loss in grams) | | | |
| 2 | 0 | 0.01 | 0 | 0 | 0.03 |
| 4 | 0 | 1.12 | 0 | 9 | 0.02 |
| 6 | 0.8 | 24.27 | 0 | 22.79 | 23.36 |
| 8 | 5.22 | 35.32 | 0 | 50.09 | 32.8 |
| 10 | 7.98 | 47.42 | 0 | 63.69 | 46.9 |
| 12 | 10.78 | 71.62 | 0.17 | 80.27 | 74.85 |
| 14 | 18.06 | 85.08 | 0.19 | 83.25 | 86.99 |
| 16 | 22.29 | | 0.01 | | |
| 18 | 26.94 | | 0 | | |
| 20 | 37.87 | | 17.51 | | |
| 22 | 44.27 | | 32.31 | | |
| 24 | 51.33 | | 48.58 | | |
| 26 | 66.94 | | 74.33 | | |
| 28 | 75.38 | | | | |

Example 4

Figure 2:
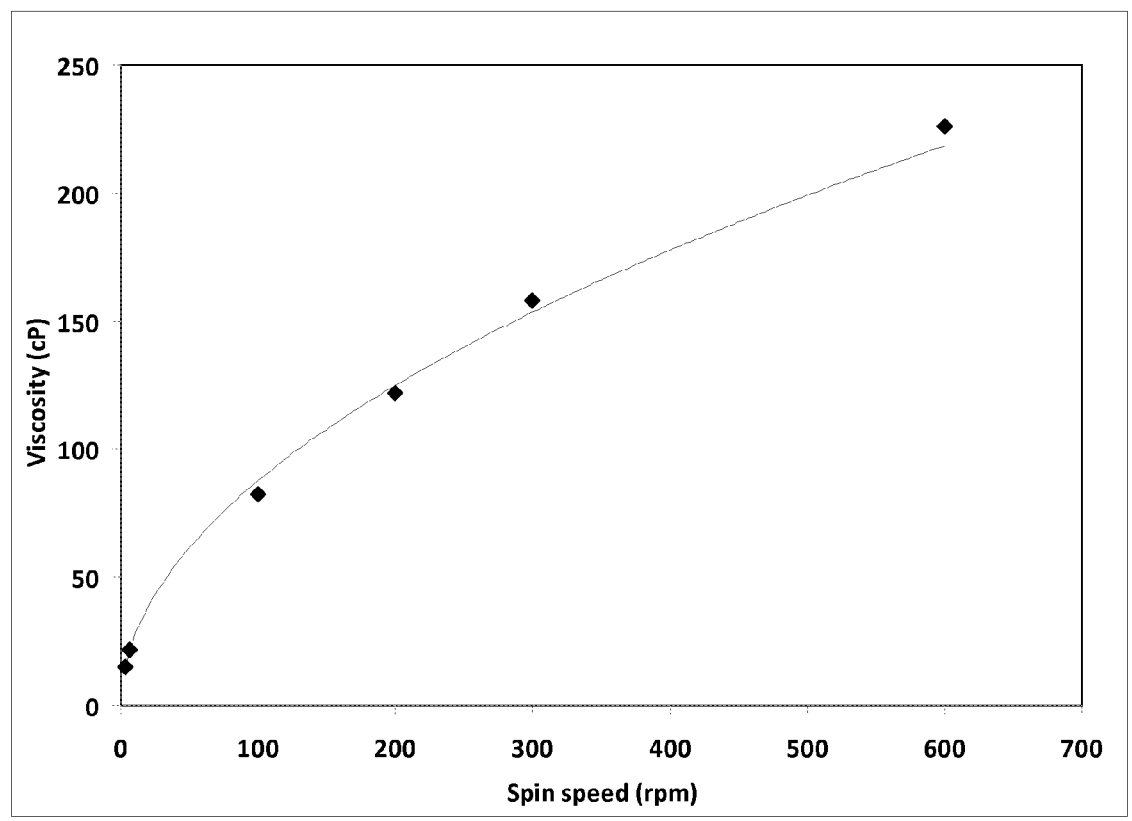
FIG. 2 demonstrates that the viscosity of the fracturing fluid increases as a function of increased shear rate indicating that it is a shear thickening fluid.
Figure 3:
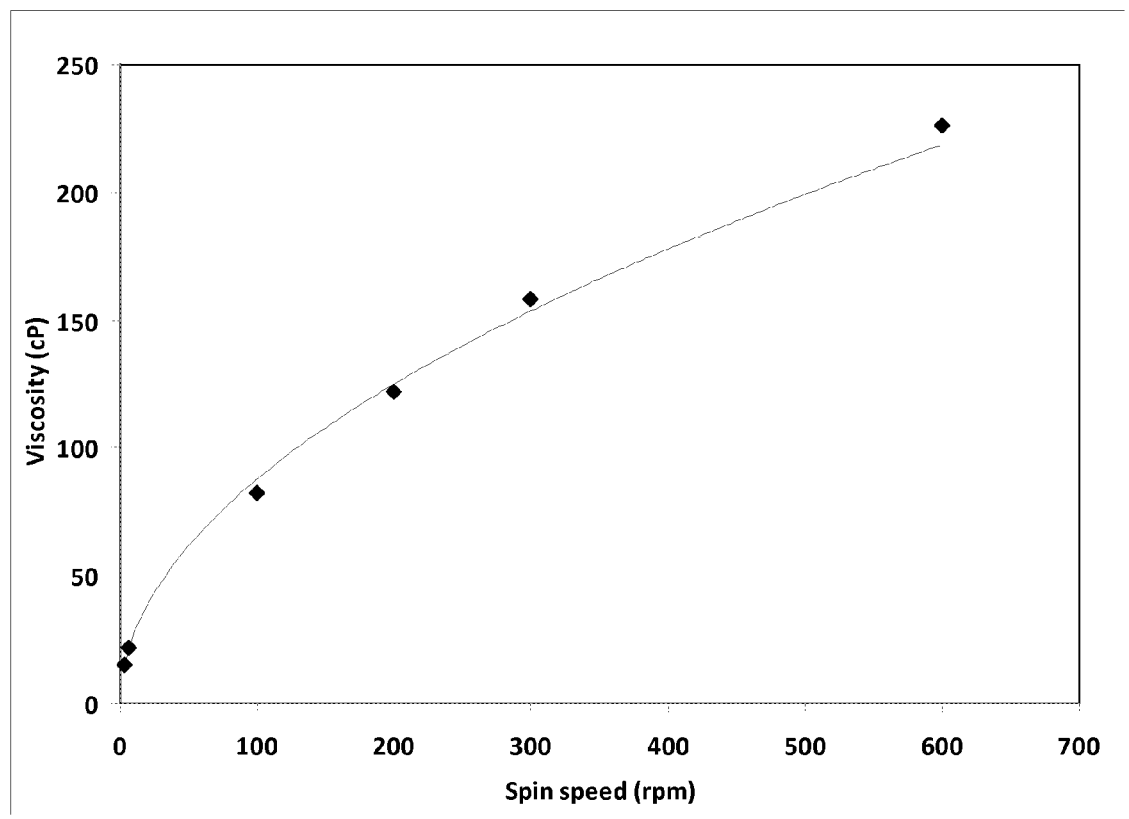

The viscosity of the fracturing fluid of the present invention was measured as a function of shear rate. Fracturing fluid containing 15% micro-gel fragments by weight was centrifuged to mimic shear force. FIG. 2 below demonstrates that the viscosity of the fracturing fluid increases as a function of increased shear rate indicating that it is a shear thickening fluid.

Example 5

The fracturing fluid of the present invention was evaluated for proppant suspension property after the passage of three days. Fracturing fluid containing 15% micro-gel fragment by weight and 6 ppg 20/40 Ottawa sand proppant by volume was prepared. The fracturing fluid was observed at t=1 day and t=3 days. No apparent settling of the proppant was observed.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
    forming swellable micro-gel fragments comprising a reaction product comprising acrylamide, polyethylene glycol diacrylate, ammonium persulfate, and tetramethyl ethylene diamine,
        wherein the swellable micro-gel fragments are crosslinked by ester based bonds;
    forming a fracturing fluid comprising an aqueous base fluid, proppant, and the swellable micro-gel fragments,
        wherein the fracturing fluid has a low-viscosity in the range of about 0 to about 800 centipoise, and
        wherein when the swellable micro-gel fragments are in a dry state, they are present in an amount of about 0.01% to about 50% by weight of the fracturing fluid, and wherein when the swellable micro-gel fragments are in a wet state, they are present in the fracturing fluid in an amount of about 1% to about 35% by weight of the fracturing fluid;
    swelling the swellable micro-gel fragments, thereby forming a matrix by suspending the proppant between surfaces of the swelled micro-gel fragments in the fracturing fluid,
        wherein the fracturing fluid comprising the matrix retains the low-viscosity in the range of about 0 to about 800 centipoise;
    placing the fracturing fluid in a fracture within the subterranean formation; and
    at least partially degrading the matrix in the subterranean formation by degrading the ester based bonds of the swellable micro-gel fragments.

2. The method of claim 1, wherein the aqueous base fluid is selected from the group consisting of: fresh water, saltwater, seawater, brine, produced water, flowback water, and any combination thereof.

3. The method of claim 1, wherein the proppant is selected from the group consisting of: sand, bauxite, ceramic material, glass material, polymer material, polytetrafluoroethylene material, nut shell piece, cured resinous particulate comprising a nut shell piece, seed shell piece, cured resinous particulate comprising seed shell piece, fruit pit piece, cured resinous particulate comprising fruit pit piece, wood, composite particulate, and any combination thereof.

4. The method of claim 1, wherein the micro-gel fragments have a non-swelled diameter of about 1 μm to about 20 μm.

5. The method of claim 1, wherein the micro-gel fragments have a swelled diameter of about 20 μm to about 500 μm.

6. The method of claim 1, wherein the fracturing fluid further comprises an additive selected from the group consisting of: clay control agents, scale inhibition agents, corrosion inhibition agents, dyeing agents, and combinations thereof.

7. A method comprising:
    forming swellable micro-gel fragments comprising a reaction product comprising 91% acrylamide, 0.01-2.3% polyethylene glycol diacrylate, 0.01-4.6% ammonium persulfate, and 0.05-2.1% tetramethyl ethylene diamine,
        wherein the swellable micro-gel fragments are crosslinked by ester based bonds;
    forming a fracturing fluid comprising an aqueous base fluid, proppant, and the swellable micro-gel fragments,
        wherein the fracturing fluid has a low-viscosity in the range of about 0 to about 800 centipoise, and
        wherein when the swellable micro-gel fragments are in a dry state, they are present in an amount of about 0.01% to about 50% by weight of the fracturing fluid, and wherein when the swellable micro-gel fragments are in a wet state, they are present in the fracturing fluid in an amount of about 1% to about 35% by weight of the fracturing fluid;
    introducing the fracturing fluid at a rate sufficient to create or enhance at least one fracture in a subterranean formation;
    swelling the swellable micro-gel fragments, thereby forming a matrix by suspending the proppant between surfaces of the swelled micro-gel fragments in the fracturing fluid, wherein the fracturing fluid comprising the matrix retains the low-viscosity in the range of about 0 to about 800 centipoise;

placing the fracturing fluid in a fracture in the subterranean formation; and at least partially degrading the matrix in the subterranean formation by degrading the ester based bonds of the swellable micro-gel fragments.

8. The method of claim 7, wherein the aqueous base fluid is selected from the group consisting of: fresh water, saltwater, seawater, brine, produced water, flowback water, and any combination thereof.

9. The method of claim 7, wherein the proppant is selected from the group consisting of: sand, bauxite, ceramic material, glass material, polymer material, polytetrafluoroethylene material, nut shell piece, cured resinous particulate comprising a nut shell piece, seed shell piece, cured resinous particulate comprising seed shell piece, fruit pit piece, cured resinous particulate comprising fruit pit piece, wood, composite particulate, and any combination thereof.

10. The method of claim 7, wherein the micro-gel fragments have a non-swelled diameter of about 1 μm to about 20 μm.

11. The method of claim 7, wherein the micro-gel fragments have a swelled diameter of about 20 μm to about 500 μm.

12. The method of claim 7, wherein the fracturing fluid further comprises an additive selected from the group consisting of: clay control agents, scale inhibition agents, corrosion inhibition agents, dyeing agents, and combinations thereof.

13. A method comprising:

forming swellable micro-gel fragments comprising a reaction product comprising 91% acrylamide, 2.3% polyethylene glycol diacrylate, 4.6% ammonium persulfate, and 2.1% tetramethyl ethylene diamine, wherein the swellable micro-gel fragments are crosslinked by ester based bonds;

forming a fracturing fluid that comprises an aqueous base fluid, a proppant, and the swellable micro-gel fragments, wherein the fracturing fluid has a low-viscosity in the range of about 0 to about 800 centipoise and is free of additional viscosifying agents and crosslinkers, and wherein the swellable micro-gel fragments are present in an amount of 15% by weight of the fracturing fluid;

swelling the swellable micro-gel fragments, thereby forming a matrix by suspending the proppant between surfaces of the swelled micro-gel fragments in the fracturing fluid, and wherein the fracturing fluid comprising the matrix retains the low-viscosity in the range of about 0 to about 800 centipoise;

placing the fracturing fluid in a fracture in the subterranean formation; and at least partially degrading the matrix in the subterranean formation by degrading the ester based bonds of the swellable micro-gel fragments.

14. The method of claim 13, wherein the aqueous base fluid is selected from the group consisting of: fresh water, saltwater, seawater, brine, produced water, flowback water, and any combination thereof.

15. The method of claim 13, wherein the micro-gel fragments have a non-swelled diameter of about 1 μm to about 20 μm.

16. The method of claim 13, wherein the micro-gel fragments have a swelled diameter of about 20 μm to about 500 μm.

17. The method of claim 13, wherein the fracturing fluid further comprises an additive selected from the group consisting of: clay control agents, scale inhibition agents, corrosion inhibition agents, dyeing agents, and combinations thereof.

* * * * *